(No Model.)

J. T. MEREDITH.
SPECTACLES.

No. 569,462.  Patented Oct. 13, 1896.

WITNESSES:
Edward Thorpe

INVENTOR
J. T. Meredith
BY
ATTORNEYS.

UNITED STATES PATENT OFFICE.

JOHN T. MEREDITH, OF SHAWNEE, OHIO.

SPECTACLES.

SPECIFICATION forming part of Letters Patent No. 569,462, dated October 13, 1896.

Application filed August 24, 1895. Serial No. 560,416. (No model.)

*To all whom it may concern:*

Be it known that I, JOHN T. MEREDITH, of Shawnee, in the county of Perry and State of Ohio, have invented new and useful Improvements in Spectacles, of which the following is a full, clear, and exact description.

The object of the invention is to provide new and improved spectacles arranged with an auxiliary temple fitted to slide on a straight temple and adapted to curve around the ear when pushed out to securely hold the spectacles in place.

The invention consists of certain parts and details and combinations of the same, as will be fully described hereinafter, and then pointed out in the claims.

Reference is to be had to the accompanying drawings, forming a part of this specification, in which similar characters of reference indicate corresponding parts in all the figures.

Figure 1:
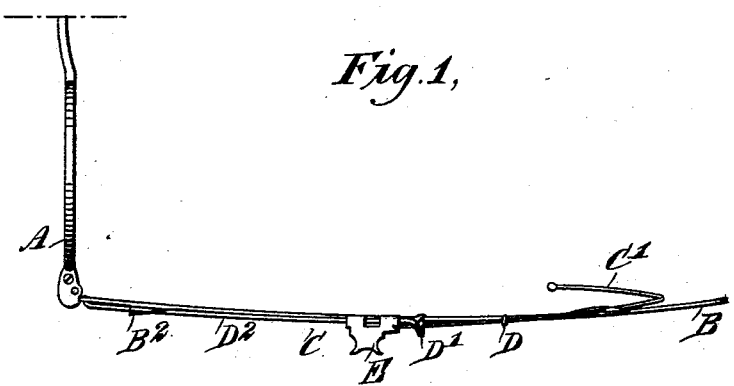
Figure 2:
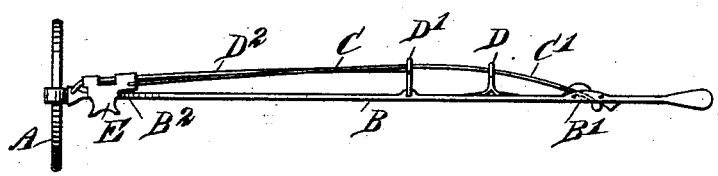
Figure 3:
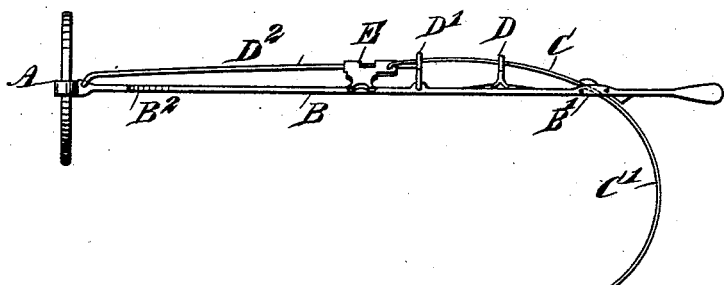

Figure 1 is a plan view of the improvement. Fig. 2 is a side elevation of the same, and Fig. 3 is a like view of the same with the auxiliary temple in position to engage the ear.

The spectacles are provided with the usual frame A, on each side of which is pivoted a straight temple B of a suitable length to engage the side of the head and hold the spectacles in place. On this straight temple B is fitted to slide an auxiliary temple C, formed at its outer end with a curved portion C', adapted to curve behind the ear when pushed out after the spectacles are in place. Normally the auxiliary temple C is in an innermost position, as shown in Fig. 2, so that the spectacles can be used with the straight temples B only for holding the spectacles in position; but when it is desired to firmly hold the spectacles in place the curved temples C are pushed outward, so as to cause the ear portions C' to be curved around the ears.

The temple C is fitted to slide in bearings D D', made in the shape of eyes, attached to the temple B, and the said temple C is also fitted to slide in a bearing B', made segmental and formed or secured directly on the temple B near the outer end thereof, so that the ear portion C' readily curves into the proper shape when the temple C is pushed out, it being understood, however, that the said temple C is made of spring metal and assumes an almost straight position when turned back into the position shown in Fig. 2.

The bearing D' is connected by a guide-rod $D^2$ with the pivot end of the temple B, and on this guide-rod is mounted to slide a catch E, connected with the inner end of the temple C and adapted to be taken hold of by the operator to push the said temple C in or out, as previously explained. The catch E is mounted to be turned on the guide-rod $D^2$, so that it can be passed behind a lug $B^2$ on the inner end of the temple B to lock the said catch E and consequently hold the auxiliary temple C in an innermost position. When in this position, the temple C forms a strengthening-rib for the temple B.

Having thus fully described my invention, I claim as new and desire to secure by Letters Patent—

1. Spectacles, provided with straight temples, auxiliary temples fitted to slide on the said straight temples, and having an outer, curved ear portion, and means for locking the said auxiliary temples to the straight temples, as set forth.

2. Spectacles, provided with straight temples, each of which is provided with bearings and a connecting guide-rod, an auxiliary temple for each straight temple, and fitted to slide in the said bearings, and a catch connected with the inner end of the auxiliary temple and fitted to slide on the said guide-rod, substantially as shown and described.

3. Spectacles provided with straight temples, each of which is provided with bearings and a connecting guide-rod, an auxiliary temple for each straight temple and fitted to slide in the said bearings, a catch connected with the inner end of the auxiliary temple and fitted to slide on the said guide-rod, and a lug on the said straight temple, and adapted to be engaged by the said catch, to lock the auxiliary temple in place, substantially as shown and described.

JOHN T. MEREDITH.

Witnesses:
CHARLES RUSK,
CHARLES T. GRIFFITH.